(12) United States Patent
Yu et al.

(10) Patent No.: US 12,246,327 B2
(45) Date of Patent: Mar. 11, 2025

(54) UNDERWATER CRUSHING MECHANISM FOR ALUMINUM HOUSING BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Haijun Yu, Guangdong (CN); Yinghao Xie, Guangdong (CN); Aixia Li, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/558,279

(22) PCT Filed: Jul. 15, 2022

(86) PCT No.: PCT/CN2022/106006
§ 371 (c)(1),
(2) Date: Oct. 31, 2023

(87) PCT Pub. No.: WO2023/226177
PCT Pub. Date: Nov. 30, 2023

(65) Prior Publication Data
US 2024/0326065 A1    Oct. 3, 2024

(30) Foreign Application Priority Data
May 27, 2022  (CN) .......................... 202210585437.0

(51) Int. Cl.
*B02C 21/00* (2006.01)
*B02C 13/09* (2006.01)
(Continued)

(52) U.S. Cl.
CPC .............. *B02C 21/00* (2013.01); *B02C 23/36* (2013.01); *B02C 23/40* (2013.01)

(58) Field of Classification Search
CPC .......... B02C 21/00; B02C 23/36; B02C 23/40
See application file for complete search history.

(56) References Cited

U.S. PATENT DOCUMENTS

| | | | |
|---|---|---|---|
| 2015/0021421 A1* | 1/2015 | Brodt | B03B 5/36 241/43 |
| 2020/0078796 A1* | 3/2020 | Kochhar | B02C 23/38 |

FOREIGN PATENT DOCUMENTS

| | | |
|---|---|---|
| CN | 202606250 | 12/2012 |
| CN | 204148000 | 2/2015 |

(Continued)

OTHER PUBLICATIONS

International Search Report And Written Opinion issued for the PCT application No. PCT/CN2022/106006 on Dec. 26, 2022 with English translation (12 pages).
(Continued)

*Primary Examiner* — Mohammed S. Alawadi
(74) *Attorney, Agent, or Firm* — Leason Ellis LLP

(57) ABSTRACT

Disclosed is an underwater crushing mechanism for an aluminum housing battery, including a crusher, where the top end of the crusher is provided with a feed port, and a crushing mechanism is arranged inside the crusher below the feed port; a water body is stored in an inner cavity of the crusher, and the crushing mechanism is immersed in the water body; the crusher is provided with a spray mechanism; the crusher at the side of the spray mechanism away from the
(Continued)

feed port is provided with a channel communicated with the inner cavity of the crusher, an opening is provided at the side of the channel away from the spray mechanism, and at least two crushed material collection chambers are arranged in the crusher at the side of the opening; and a collection frame is movably arranged in the channel.

8 Claims, 4 Drawing Sheets

(51) Int. Cl.
    *B02C 13/286*     (2006.01)
    *B02C 13/31*     (2006.01)
    *B02C 23/36*     (2006.01)
    *B02C 23/40*     (2006.01)
    *B03B 9/06*     (2006.01)
    *H01M 6/52*     (2006.01)
    *H01M 10/54*     (2006.01)

(56) References Cited

FOREIGN PATENT DOCUMENTS

| | | |
|---|---|---|
| CN | 210079631 | 2/2020 |
| CN | 210632212 | 5/2020 |
| CN | 111697281 | 9/2020 |
| CN | 213050998 | 4/2021 |
| CN | 213856283 | 8/2021 |
| CN | 214234414 | 9/2021 |
| CN | 113618965 | 11/2021 |
| CN | 114515644 | 5/2022 |
| JP | 2006000714 | 1/2006 |
| JP | 2011235245 | 11/2011 |
| JP | 2012110850 | 6/2012 |
| KR | 20200052761 | 5/2020 |

OTHER PUBLICATIONS

First Search Report for Chinese family member. CN115155785A on Apr. 17, 2023 with English translation (5 pages).
First office Action for Chinese family member. CN115155785A on Apr. 17, 2023 with English translation (11 pages).

\* cited by examiner

UNDERWATER CRUSHING MECHANISM FOR ALUMINUM HOUSING BATTERY

CROSS-REFERENCE TO RELATED APPLICATION

This application is a national stage filing under 35 U.S.C. § 371 of international application number PCT/CN2022/106006, filed Jul. 15, 2022, which claims priority to Chinese patent application No. 202210585437.0, filed May 27, 2022. The contents of these applications are incorporated herein by reference in their entirety.

TECHNICAL FIELD

The present invention relates to the technical field of waste battery crushing, and more particularly, to an underwater crushing mechanism for an aluminum housing battery.

BACKGROUND

Waste batteries need to be discharged, crushed, screened, etc. in sequence when being recycled. Most of the common waste battery crushing mechanisms are dry crushing mechanisms, that is, batteries are crushed by a crushing auger or a crushing roller, battery housings are peeled off, and the battery housings are separated from inner cores. Although the dry crushing mechanisms can fully peel off battery housings, such equipment will generate a large amount of debris splashing and electrolyte leakage in the process of crushing a large number of batteries. The splashing debris and volatile electrolytes can easily pollute the environment where the processing equipment is located, affecting the environment safety. Moreover, some waste batteries will be short-circuited due to incomplete discharge when being crushed. Thus, when a crushing mechanism crushes batteries for a long time, the crushing end will generate a lot of heat energy to make battery debris spark and burn, which will not only damage the crushing end of the crushing mechanism, but also affect the environment safety due to exhaust gas generated by electrolyte combustion. Meanwhile, when existing crushing mechanisms crush batteries for a long time, the accumulation of crushed material easily happen, and the full crushing of batteries cannot be guaranteed, so that it is easy to cause aluminum housings in the waste battery crushed material to be insufficiently separated from other particles, which not only cannot fully recycle aluminum housings and other debris of waste batteries, but also reduces the particle recovery rate of waste batteries, resulting in waste. Therefore, crushing mechanisms adopting a method of underwater crushing can achieve charged crushing and reduce electrolyte combustion on the one hand, and can also directly clean up the residual electrolytes on housings and inner cores on the other hand to ensure that the separated aluminum housings and other debris can be easily subjected to subsequent processing, so as to solve the problems mentioned above.

SUMMARY

The present invention aims to provide an underwater crushing mechanism for an aluminum housing battery, so as to solve the problems mentioned in the above background art.

In order to achieve the above-mentioned object, a solution of the present invention is as follows: an underwater crushing mechanism for an aluminum housing battery, including a crusher, a feed port is provided at the top end of the crusher, and a crushing mechanism is arranged inside the crusher below the feed port; a motor configured to drive the crushing mechanism to rotate is provided at the outer side of the crusher; a water body is stored in an inner cavity of the crusher, and the crushing mechanism is immersed in the water body; the crusher is provided with a spray mechanism configured to pump the water body inside the crusher and spray the water body at the feed port; the crusher at the side of the spray mechanism away from the feed port is provided with a channel communicated with the inner cavity of the crusher, an opening is provided at the side of the channel away from the spray mechanism, and at least two crushed material collection chambers are arranged in the crusher at the side of the opening; and a collection frame is movably arranged in the channel, and the collection frame is raised and lowered along the channel and flipped at the opening, so that crushed material collected in the collection frame fall into the crushed material collection chambers.

Further, a material guiding bevel edge is arranged inside the crusher below the feed port.

Furthermore, the crushing mechanism includes a first crushing part and a second crushing part, where the first crushing part includes at least two crushing liner plates and a crushing rotor; the crushing rotor is rotatably arranged at the lower end of an inclined section of the material guiding bevel edge, and the crushing liner plates are movably arranged above the crushing rotor and inside the crusher at one end of the crushing rotor away from the material guiding bevel edge, so that when sliding along the material guiding bevel edge to the crushing rotor, material can be thrown onto the crushing liner plates by means of the rotation of the crushing rotor to be impacted and crushed.

Further, each crushing liner plate includes an elastic connector and an impact plate, where the elastic connector is movably connected to one end of the impact plate, and one end of the elastic connector extends to the outside of the crusher; and the end of the impact plate away from the elastic connector is hinged in an inner wall of the crusher, so that the impact plate can change its own angle by means of the adjustment and pulling from the elastic connector.

Furthermore, each elastic connector includes a grip, a screw, a spring and a fixing frame, where the grip and the fixing frame are respectively fixed at both ends of the screw, the screw is helically arranged in a side wall of the crusher, and the grip and the fixing frame are respectively located on the outside and inside of the crusher; the fixing frame is hingedly fixed with the impact plate; and the spring is sleeved on the outside of the screw between the inner wall of the crusher and the fixing frame.

Further, each impact plate includes an impact frame and toothed liner plates, where the impact frame is connected to the elastic connector, and the toothed liner plates are arranged at the side of the impact frame facing the crushing rotor.

Further, the second crushing part is located in the inner cavity of the crusher that is directly below the material guiding bevel edge; and the second crushing part includes upper and lower crushing rollers, with the rotation directions of the two crushing rollers being opposite.

Further, the depth of the channel is greater than 2 times the height of the collection frame, and the height of the channel opening is greater than half the height of the collection frame; and a guide rail used for restricting the raising and lowering movement of the collection frame is arranged inside the channel.

Furthermore, at least one baffle plate is arranged inside the collection frame, one end of the collection frame at the upper and lower ends of the baffle plate is provided with material leading chutes in an inclined manner, and the other end of the collection frame at the upper and lower ends of the baffle plate is movably provided with a flip cover.

Further, the spray mechanism includes a spray base, a water pump and a water inlet pipe, where the spray base is fixed on the inner wall of the crusher at the feed port; the water pump is fixed on the outside of the crusher and communicated with the spray base through a pipeline; and a water collecting tank is also arranged in the middle of the channel, a filter screen is provided between the water collecting tank and the channel, one end of the water inlet pipe is connected to a water inlet end of the water pump, and the other end extends to the inside of the water collecting tank.

Compared with the prior art, the present invention has the following beneficial effects:

(1) according to the present invention, waste batteries are crushed underwater by a crushing mechanism to reduce electrolyte combustion generated by incomplete battery discharge, and the residual electrolytes on battery housings and inner cores are taken away by means of the water body, which is more conducive to subsequent processing of the crushed battery material;

(2) according to the present invention, the first crushing part and the second crushing part form the crushing mechanism, and the crushing liner plates and the crushing rotor form the first crushing part, so that waste batteries can be preliminarily crushed by the first crushing part and then secondarily crushed by the second crushing part, which improves the crushing accuracy of waste batteries; in addition, the second crushing part will drive the water body to flow during the process of rotation, so that after entering the water body, the battery particles preliminarily crushed by the first crushing part can be driven by the flowing water body to the second crushing part for secondary crushing, which can effectively avoid the accumulation of debris preliminarily crushed, ensure that all the battery debris after preliminary crushing can be secondarily crushed, and ensure full crushing of batteries, thus ensuring that aluminum housings, electrodes and other substances of batteries can be fully separated, and improving the recovery rate of waste battery crushed material;

(3) according to the present invention, a movable collection frame is adopted to enable the battery debris suspended in the water body to be stored in layers when the collection frame is put into the crusher, and accommodating chambers in the collection frame can be opened by moving and flipping the collection frame along the guide rail to enable the battery debris collected in the collection frame to automatically fall into the crushed material collection chambers for classified centralized collection, so that the classified battery crushed material can be directly subjected to subsequent processing; and (4) according to the present invention, a spray mechanism is adopted to pump, through the water pump, the water body in the crusher into the spray base for spraying, so as to wash the side wall of the feed port by means of the water body sprayed by the spray base, which can not only accelerate the fall of waste batteries, and avoid the unsmooth accumulation of waste batteries at the feed port or at the crushing mechanism, but also avoid discharge combustion caused by electrolyte leakage when waste batteries are crushed, and reduce the impact of exhaust gas generated by electrolyte combustion on the environment.

Figure 1:
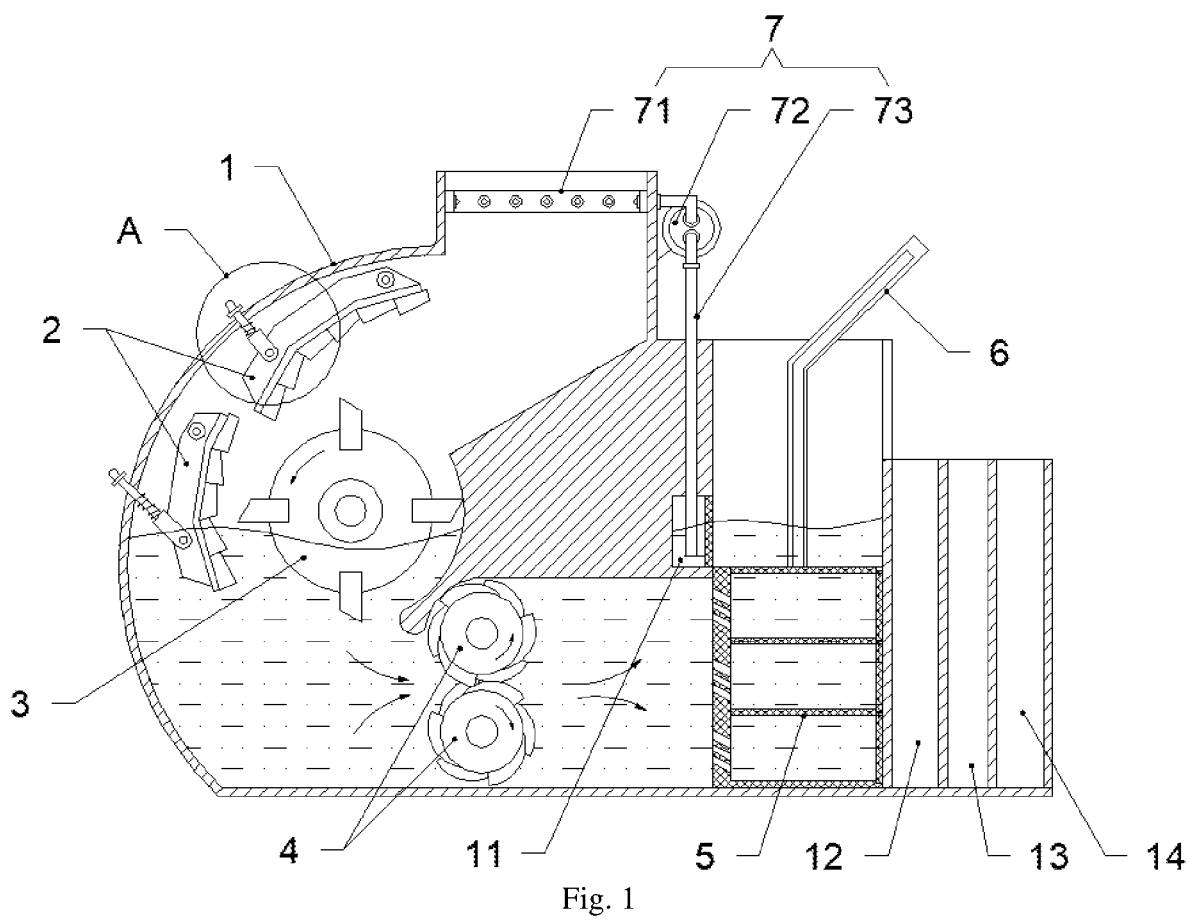
FIG. 1 is a schematic diagram of a cross-sectional structure of the present invention.

In the drawings, a list of components represented by each reference numeral is as follows:

Crusher 1, Water Collecting Tank 11, First Collection Chamber 12, Second Collection Chamber 13, Third Collection Chamber 14, Crushing Liner Plate 2, Grip 21, Screw 22, Spring 23, Fixing Frame 24, Impact Frame 25, Toothed Liner Plate 26, Crushing Rotor 3, Second Crushing Part 4, Collection Frame 5, Material leading Chute 51, Baffle Plate 52, Flip cover 53, Guide Rail 6, Spray Mechanism 7, Spray Base 71, Water Pump 72, Water Inlet Pipe 73.

DETAILED DESCRIPTION

Embodiments of the present invention are described in detail below, and examples of the embodiments are shown in the drawings, wherein the same or similar reference numerals refer to the same or similar elements or elements having the same or similar functions throughout. The embodiments described below with reference to the drawings are exemplary and intended to be used to explain the present invention and are not to be construed as limiting the present invention.

Embodiment One

As shown in FIG. 1 to FIG. 5, an underwater crushing mechanism for an aluminum housing battery, including a crusher 1, where the top end of the crusher 1 is provided with a feed port (not shown in the figures), and a crushing mechanism is arranged inside the crusher 1 below the feed port; the outer side of the crusher 1 is provided with a motor (not shown in the figures) configured to drive the crushing mechanism to rotate; a water body is stored in an inner cavity of the crusher 1, and the crushing mechanism is immersed in the water body; the crusher 1 is provided with a spray mechanism 7 configured to pump the water body inside the crusher 1 and spray the water body at the feed port; the crusher 1 at the side of the spray mechanism 7 away from the feed port is provided with a channel (not shown in the figures) communicated with the inner cavity of the crusher 1, an opening (not shown in the figures) is provided at the side of the channel away from the spray mechanism 7, and at least two crushed material collection chambers are arranged in the crusher 1 at the side of the opening; and a collection frame 5 is movably arranged in the channel, and the collection frame 5 is raised and lowered along the channel and flipped at the opening, so that crushed material collected in the collection frame 5 fall into the crushed material collection chambers; where after the collection frame 5 is completely placed inside the crusher 1, the liquid level of the water body in the inner cavity of the crusher 1 exceeds the top end of the collection frame 5; there are preferably three crushed material collection chambers, which are a first collection chamber 12, a second collection chamber 13 and a third collection chamber 14, respectively; after being injected into the crusher 1 through the feed port, waste batteries can be crushed underwater by the crushing mechanism to reduce electrolyte combustion generated by incomplete battery discharge, and the remaining electrolytes on battery housings and inner cores are taken away by means of the water body, which is more conducive to subsequent processing of the crushed battery material; the spray mechanism 7 can pump the water body inside the crusher 1 to the feed port for spraying out, which can not only drive the waste batteries to fall by means of the flowing water body, and reduce the accumulation of batteries at the feed port, but also reduce, during the crushing process of the crushing mechanism, the loss caused by the overheating of the crushing end or the spark generated when batteries are crushed, thus improving the safety of the device during use; and during operation, the crushing mechanism also pushes the water body to flow, so that the crushed battery material (aluminum housings, pole pieces and other substances) will suspend in different positions in the water body under the drive of the water flow, and will respectively enter different accommodating chambers in the collection frame 5 for centralized collection, so that through the raising and lowering rotation of the collection frame 5, the collected battery crushed material are respectively poured into the first collection chamber 12, the second collection chamber 13 and the third collection chamber 14 for classified storage, which is more conducive to subsequent processing of each battery crushed material after collected.

Figure 2:
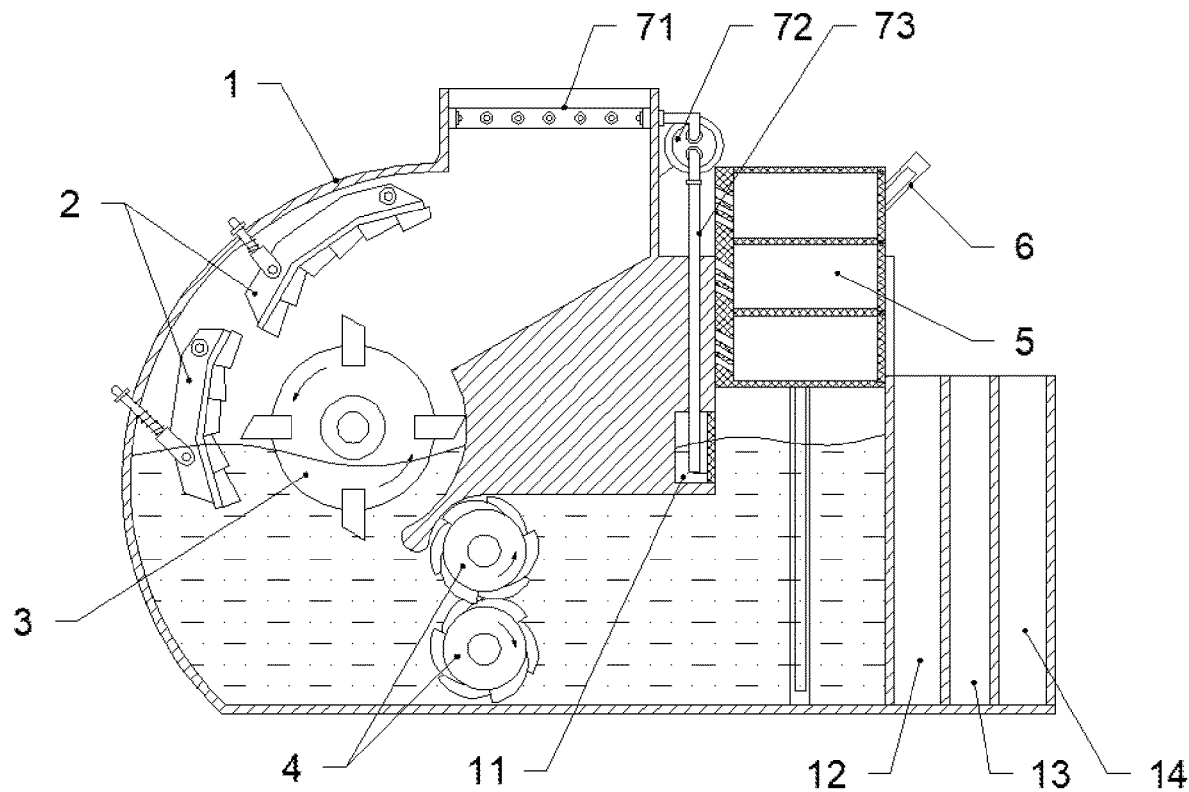
FIG. 2 is a schematic diagram of a cross-sectional structure of a collection frame in a raising state according to the present invention.
Figure 3:
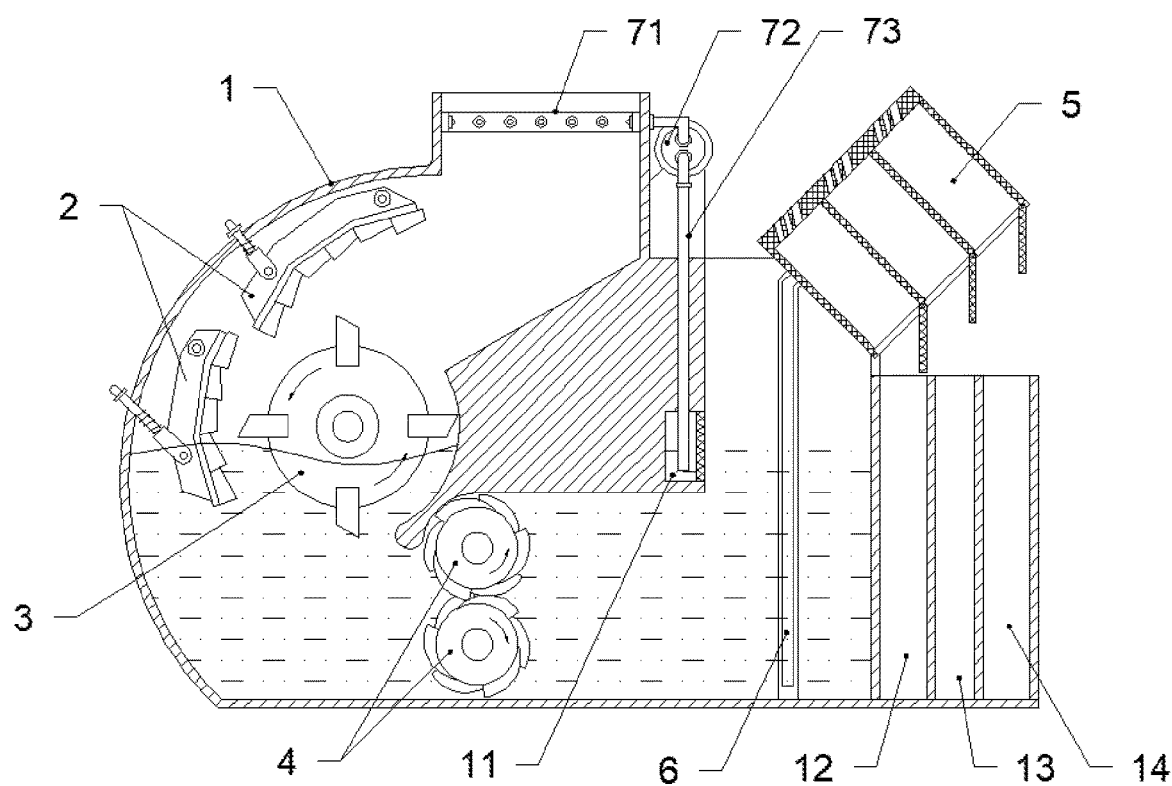
FIG. 3 is a schematic diagram of the cross-sectional structure of the collection frame in a flipping state according to the present invention.
Figure 4:
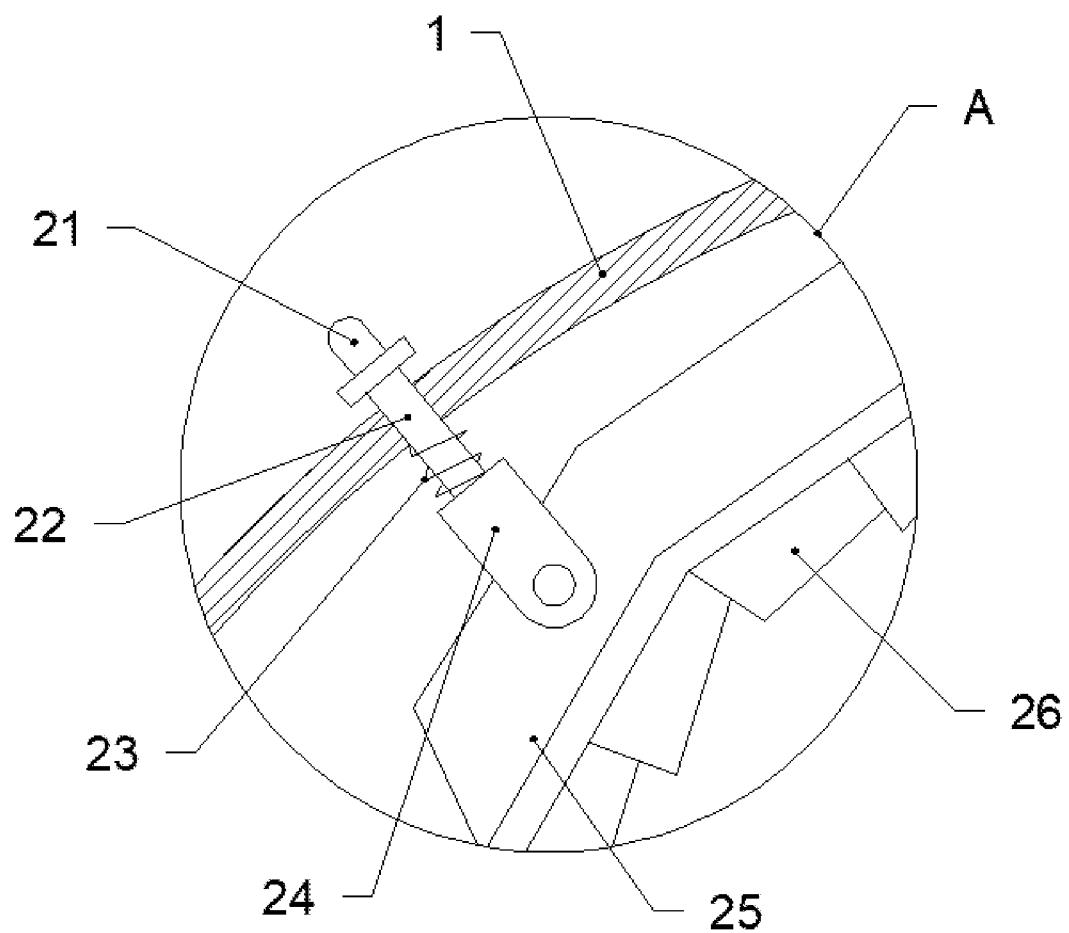
FIG. 4 is a schematic diagram of an enlarged structure of A in FIG. 1 according to the present invention.

As shown in FIG. 1 to FIG. 3, in the present embodiment, a material guiding bevel edge is arranged inside the crusher 1 below the feed port, where the material guiding bevel edge can guide waste batteries put in to ensure that the waste batteries can be moved to the crushing mechanism for crushing.

As shown in FIG. 1 to FIG. 4, in the present embodiment, the crushing mechanism includes a first crushing part and a second crushing part 4, where the first crushing part includes at least two crushing liner plates 2 and a crushing rotor 3; the crushing rotor 3 is rotatably arranged at the lower end of an inclined section of the material guiding bevel edge, and the crushing liner plates are movably arranged above the crushing rotor 3 and inside the crusher 1 at one end of the crushing rotor 3 away from the material guiding bevel edge, so that when sliding along the material guiding bevel edge to the crushing rotor 3, material can be thrown onto the crushing liner plates 2 by means of the rotation of the crushing rotor 3 to be impacted and crushed; in the present embodiment, each crushing liner plate 2 includes an elastic connector and an impact plate, where the elastic connector is movably connected to one end of the impact plate, and one end of the elastic connector extends to the outside of the crusher 1; and the end of the impact plate away from the elastic connector is hinged in an inner wall of the crusher 1, so that the impact plate can change its own angle by means of the adjustment and pulling from the elastic connector; in the present embodiment, each elastic connector includes a grip 21, a screw 22, a spring 23 and a fixing frame 24, where the grip 21 and the fixing frame 24 are respectively fixed at both ends of the screw 22, the screw 22 is helically arranged in a side wall of the crusher 1, and the grip 21 and the fixing frame 24 are respectively located on the outside and inside of the crusher 1; the fixing frame 24 is hingedly fixed with the impact plate; and the spring 23 is sleeved on the outside of the screw 22 between the inner wall of the crusher 1 and the fixing frame 24; in the present embodiment, each impact plate includes an impact frame 25 and toothed liner plates 26, where the impact frame 25 is connected to the elastic connector, and the toothed liner plates 26 are arranged at the side of the impact frame 25 facing the crushing rotor 3, where the crushing liner plates 2 and the crushing rotor 3 can form an impact crusher, so that when waste batteries are injected into the crusher 1 from the feed port and slide along the material guiding bevel edge to the crushing rotor 3, the material can be thrown onto the crushing liner plates 2 by means of the rotation of the crushing rotor 3 to be impacted and crushed, thus realizing the preliminary crushing of batteries; and each elastic connector can drive the screw 22 to be rotatably raised and lowered through the grip 21, so as to pull the raising and lowering adjustment of the fixing frame 24 through the screw 22, so that the impact frame 25 of the impact plate is pulled by the fixing frame 24 to rotate around a hinge shaft inside the crusher 1, and the angle of the toothed liner plates 26 on the impact plate is changed, so as to adjust the distance between the crushing liner plates 2 and the crushing rotor 3, thus meeting the preliminary crushing particle size requirements for waste batteries of different sizes.

As shown in FIG. 1 to FIG. 3, in the present embodiment, the second crushing part 4 is located in the inner cavity of the crusher 1 that is directly below the material guiding bevel edge; and the second crushing part 4 includes upper and lower crushing rollers, with the rotation directions of the two crushing rollers being opposite, where two second crushing parts 4 drive the water body to flow during the process of rotation, so that after entering the water body, the battery particles preliminarily crushed by the first crushing part can be driven by the flowing water body to the second crushing parts for secondary crushing, which can avoid the accumulation of debris after preliminary crushing, also finely crush the battery particles preliminarily crushed, improve the crushing accuracy of waste batteries, and ensure full crushing of batteries, thus ensuring that aluminum housings, electrodes and other substances of batteries can be fully separated, and improving the recovery rate of waste battery crushed material.

As shown in FIG. 1 to FIG. 3, in the present embodiment, the depth of the channel is greater than 2 times the height of the collection frame 5, and the height of the channel opening is greater than half the height of the collection frame 5; and a guide rail 6 used for restricting the raising and lowering movement of the collection frame 5 is arranged inside the channel, where the guide rail 6 includes vertical ends and an inclined end, the vertical ends of the guide rail 6 are vertically arranged on the inner walls on both sides of the channel, and the inclined end of the guide rail 6 extends obliquely upward to one end of the crushed material collection chambers to ensure that the collection frame 5, when placed inside the channel, can be used as a separator to isolate the inner cavity and the channel at the second crushing part 4, and to ensure that the crushed particles in the water body in the inner cavity at the second crushing part 4 can completely enter the collection frame 5 for collection; and the channel opening at a special position and the guide rail 6 can make the collection frame 5 flip at the opening when moving from the vertical ends to the inclined end on the guide rail 6, so that the collected battery crushed material (aluminum housings, pole pieces and other substances) can be respectively poured into the first collection chamber 12, the second collection chamber 13 and the third collection chamber 14 for classified storage after the collection frame 5 is flipped.

Figure 5:
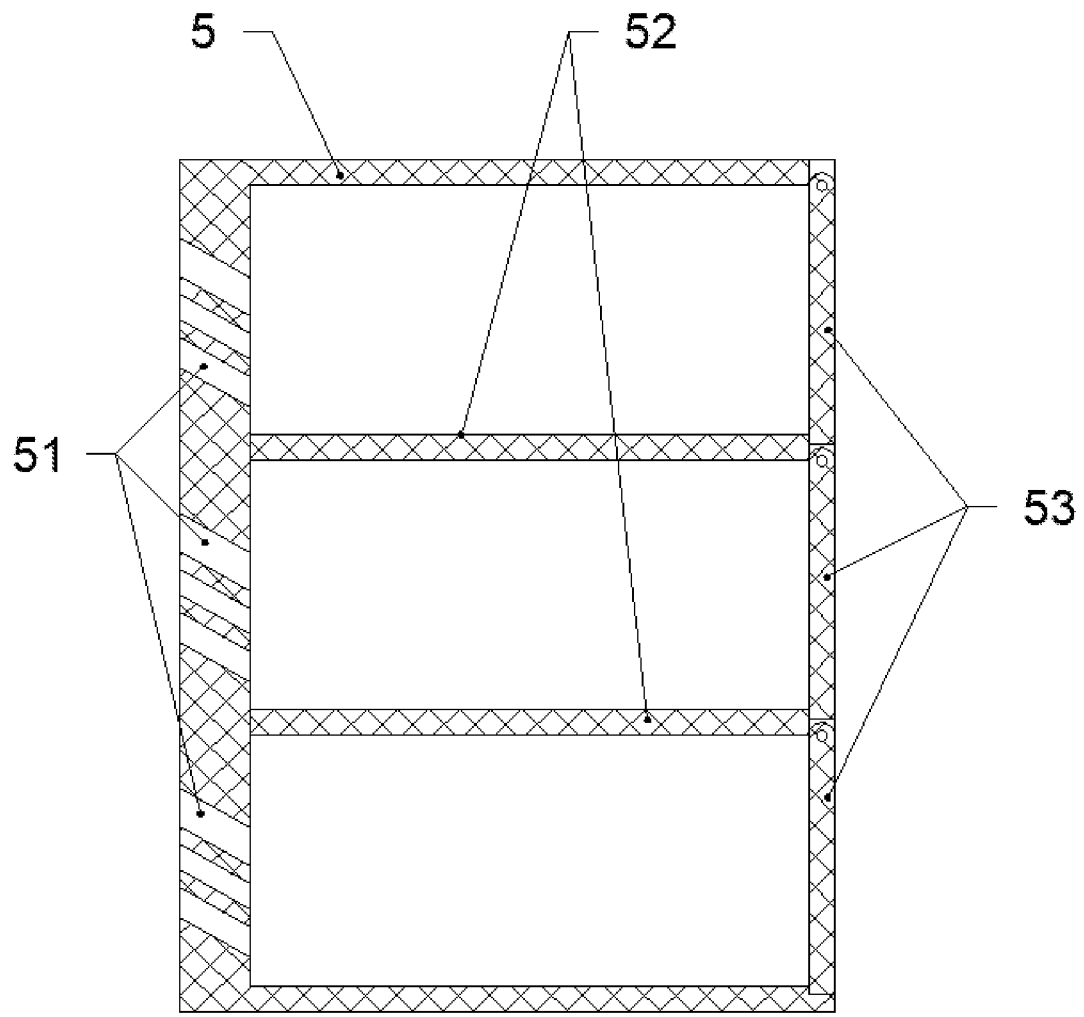
FIG. 5 is a schematic structural diagram of the collection frame according to the present application.

As shown in FIG. 5, in the present embodiment, at least one baffle plate 52 is arranged inside the collection frame 5, one end of the collection frame 5 at the upper and lower ends of the baffle plate 52 is provided with a material leading chute 51 in an inclined manner, and the other end of the collection frame 5 at the upper and lower ends of the baffle plate 52 is movably provided with a flip cover 53, where there are preferably two baffle plates 52, so that the collection frame 5 can be divided into three accommodating chambers by the baffle plates 52 to classify and store the crushed battery material (aluminum housings, pole pieces and other substances); the specially shaped material leading chute 51 can effectively prevent the battery crushed material from floating out under the fluctuation of the water flow after entering the collection frame 5, thus ensuring the stable collection of battery crushed material in the collection frame 5; and the flip cover 53 is located on one side of the crushed material collection chambers to enable the flip cover 53 to be flipped by gravity during the flipping of the collection frame 5, so as to open the accommodating chambers of the collection frame 5, so that the battery crushed material collected in the collection frame 5 can automatically fall into the crushed material collection chambers for classified centralized collection.

In the present embodiment, the number of the accommodating chambers corresponds to the number of the crushed material collection chambers to ensure that the battery debris collected in each accommodating chamber can be injected into a separate crushed material collection chamber for classified collection.

As shown in FIG. 1 to FIG. 3, in the present embodiment, the spray mechanism 7 includes a spray base 71, a water pump 72 and a water inlet pipe 73, where the spray base 71 is fixed on the inner wall of the crusher 1 at the feed port; the water pump 72 is fixed on the outside of the crusher 1 and communicated with the spray base 71 through a pipeline; and a water collecting tank 11 is also arranged in the middle of the channel, a filter screen is provided between the water collecting tank 11 and the channel, one end of the water inlet pipe 73 is connected to a water inlet end of the water pump 72, and the other end extends to the inside of the water collecting tank 11, where the water pump 72 can pump the water body in the water collecting tank 11 into the spray base 71 through the water inlet pipe 73, so as to wash the side wall of the feed port by means of the water body sprayed by the spray base 71, which can not only accelerate the fall of waste batteries, and avoid the unsmooth accumulation of waste batteries at the feed port or at the crushing mechanism, but also reduce discharge combustion caused by electrolyte leakage when waste batteries are crushed, and reduce the impact of exhaust gas generated by electrolyte combustion on the environment; and the water collecting tank 11 at a special position can ensure the cleanliness of the water body here, thereby reducing the damage caused by battery debris floating in the water body to the water pump 72.

To sum up, according to the underwater crushing mechanism for an aluminum housing battery provided by the present invention, waste batteries are crushed underwater by the crushing mechanism to reduce electrolyte combustion generated by incomplete battery discharge, and the remaining electrolytes on battery housings and inner cores are taken away by means of the water body, which is more conducive to subsequent processing of the crushed battery material; the spray mechanism 7 pumps the water body inside the crusher 1 to the feed port for spraying out, which can not only drive the waste batteries to fall by means of the flowing water body, and reduce the accumulation of batteries at the feed port, but also reduce, during the crushing process of the crushing mechanism, the loss caused by the overheating of the crushing end or the spark generated when batteries are crushed, thus improving the safety of the device during use; and during operation, the crushing mechanism also pushes the water body to flow, so that the crushed battery material (aluminum housings, pole pieces and other substances) will suspend in different positions in the water body under the drive of the water flow, and will respectively enter different accommodating chambers in the collection frame 5 for centralized collection, so that through the raising and lowering rotation of the collection frame 5, the collected battery crushed material are respectively poured into the first collection chamber 12, the second collection chamber 13 and the third collection chamber 14 for classified storage, which is more conducive to subsequent processing of each battery crushed material after being collected, and improves the recovery rate of waste battery crushed material.

In the description of the present specification, descriptions with reference to the terms "one embodiment", "some embodiments", "examples", "specific examples", or "some examples", etc. refer to that specific features described in conjunction with the embodiment or example, structures, materials, or characteristics are included in at least one embodiment or example of the present invention. In the present specification, illustrative representations of the above-mentioned terms should not be construed as necessarily referring to the same embodiments or examples. Furthermore, the specific features, structures, materials, or characteristics described may be combined in any one or more embodiments or examples in a suitable manner. In addition, those skilled in the art can engage and combine different embodiments or examples described in the present specification.

Although the embodiments of the present invention have been shown and described above, it is to be understood that the above-mentioned embodiments are exemplary and should not be construed as limiting the present invention, and those having ordinary skill in the art can make changes, modifications, substitutions and variations to the above-mentioned embodiments within the scope of the present invention.

The invention claimed is:

1. An underwater crushing apparatus for an aluminum housing battery, comprising a crusher (1), wherein a feed port is provided at a top end of the crusher (1), and a crushing mechanism is arranged inside the crusher (1) below the feed port; a motor configured to drive the crushing mechanism to rotate is provided at an outer side of the crusher (1); an inner cavity of the crusher (1) is configured to store water, and the crushing mechanism is configured to be immersed in the water; the crusher (1) is provided with a spray mechanism (7) configured to pump the water inside the crusher (1) and spray the water at the feed port; the crusher (1) at a side of the spray mechanism (7) away from the feed port is provided with a channel communicated with the inner cavity of the crusher (1), an opening is provided at a side of the channel away from the spray mechanism (7), and at least two crushed material collection chambers are arranged in the crusher (1) at a side of the opening; and a collection frame (5) is movably arranged in the channel, and the collection frame (5) is configured to raise and lower along the channel and flip at the opening, so as to allow crushed material collected in the collection frame (5) to fall into the crushed material collection chambers;

wherein a material guiding bevel edge is arranged inside the crusher (1) below the feed port;

wherein the crushing mechanism comprises a first crushing part and a second crushing part (4); the first crushing part comprises at least two crushing liner plates (2) and a crushing rotor (3); the crushing rotor (3) is rotatably arranged at a lower end of an inclined section of the material guiding bevel edge, and the crushing liner plates are movably arranged above the crushing rotor (3) and inside the crusher (1) at one end of the crushing rotor (3) away from the material guiding bevel edge, so that when material is sliding along the material guiding bevel edge to the crushing rotor (3), the material is thrown onto the crushing liner plates (2) by means of the rotation of the crushing rotor (3) to be impacted and crushed;

wherein the second crushing part (4) is located in the inner cavity of the crusher (1) that is directly below the material guiding bevel edge; and the second crushing part (4) comprises an upper crushing roller and a lower crushing roller, with rotation directions of the upper crushing roller and the lower crushing roller being opposite;

wherein a depth of the channel is greater than 2 times a height of the collection frame (5), and a height of the channel opening is greater than half the height of the collection frame (5); and a guide rail (6) is arranged inside the channel, the guide rail (6) is configured to restrict the collection frame (5) from raising and lowering; and wherein at least one baffle plate (52) is arranged inside the collection frame (5), one end of the collection frame (5) at upper and lower ends of the baffle plate (52) is provided with a material leading chute (51) in an inclined manner, and other end of the collection frame (5) at the upper and lower ends of the baffle plate (52) is movably provided with a flip cover (53).

2. The underwater crushing apparatus of claim 1, wherein each of the crushing liner plates (2) comprises an elastic connector and an impact plate; the elastic connector is movably connected to one end of the impact plate, and one end of the elastic connector extends to an outside of the crusher (1); and the end of the impact plate away from the elastic connector is hinged in an inner wall of the crusher (1), so as to allow the impact plate to change its own angle by means of adjustment and pulling from the elastic connector.

3. The underwater crushing apparatus of claim 2, wherein the elastic connector comprises a grip (21), a screw (22), a spring (23) and a fixing frame (24); the grip (21) and the fixing frame (24) are respectively fixed at both ends of the screw (22), the screw (22) is helically arranged in a side wall of the crusher (1), and the grip (21) and the fixing frame (24) are respectively located on the outside and inside of the crusher (1); the fixing frame (24) is hingedly fixed with the impact plate; and the spring (23) is sleeved on an outside of the screw (22) between the inner wall of the crusher (1) and the fixing frame (24).

4. The underwater crushing apparatus of claim 3, wherein the impact plate comprises an impact frame (25) and toothed liner plates (26); the impact frame (25) is connected to the elastic connector, and the toothed liner plates (26) are arranged at a side of the impact frame (25) facing the crushing rotor (3).

5. The underwater crushing apparatus of claim 3, wherein the spray mechanism (7) comprises a spray base (71), a water pump (72) and a water inlet pipe (73); the spray base (71) is fixed on an inner wall of the crusher (1) at the feed port; the water pump (72) is fixed on an outer wall of the crusher (1) and communicated with the spray base (71) through a pipeline; and a water collecting tank (11) is further arranged in the channel, a filter screen is provided between the water collecting tank (11) and the channel, one end of the water inlet pipe (73) is connected to a water inlet end of the water pump (72), and another end of the water inlet pipe (73) extends into the water collecting tank (11).

6. The underwater crushing apparatus of claim 4, wherein the spray mechanism (7) comprises a spray base (71), a water pump (72) and a water inlet pipe (73); the spray base (71) is fixed on an inner wall of the crusher (1) at the feed port; the water pump (72) is fixed on an outer wall of the crusher (1) and communicated with the spray base (71) through a pipeline; and a water collecting tank (11) is further arranged in the channel, a filter screen is provided between the water collecting tank (11) and the channel, one end of the water inlet pipe (73) is connected to a water inlet end of the water pump (72), and another end of the water inlet pipe (73) extends into the water collecting tank (11).

7. The underwater crushing apparatus of claim 2, wherein the spray mechanism (7) comprises a spray base (71), a water pump (72) and a water inlet pipe (73); the spray base (71) is fixed on an inner wall of the crusher (1) at the feed port; the water pump (72) is fixed on an outer wall of the crusher (1) and communicated with the spray base (71) through a pipeline; and a water collecting tank (11) is further arranged in the channel, a filter screen is provided between the water collecting tank (11) and the channel, one end of the water inlet pipe (73) is connected to a water inlet end of the water pump (72), and another end of the water inlet pipe (73) extends into the water collecting tank (11).

8. The underwater crushing apparatus of claim 1, wherein the spray mechanism (7) comprises a spray base (71), a water pump (72) and a water inlet pipe (73); the spray base (71) is fixed on an inner wall of the crusher (1) at the feed port; the water pump (72) is fixed on an outer wall of the crusher (1) and communicated with the spray base (71) through a pipeline; and a water collecting tank (11) is further arranged in the channel, a filter screen is provided between the water collecting tank (11) and the channel, one end of the water inlet pipe (73) is connected to a water inlet end of the water pump (72), and another end of the water inlet pipe (73) extends into the water collecting tank (11).

* * * * *